(No Model.)
M. G. HUBBARD, Jr.
BRAKE CONNECTION FOR TRUCKS.
No. 572,992. Patented Dec. 15, 1896.
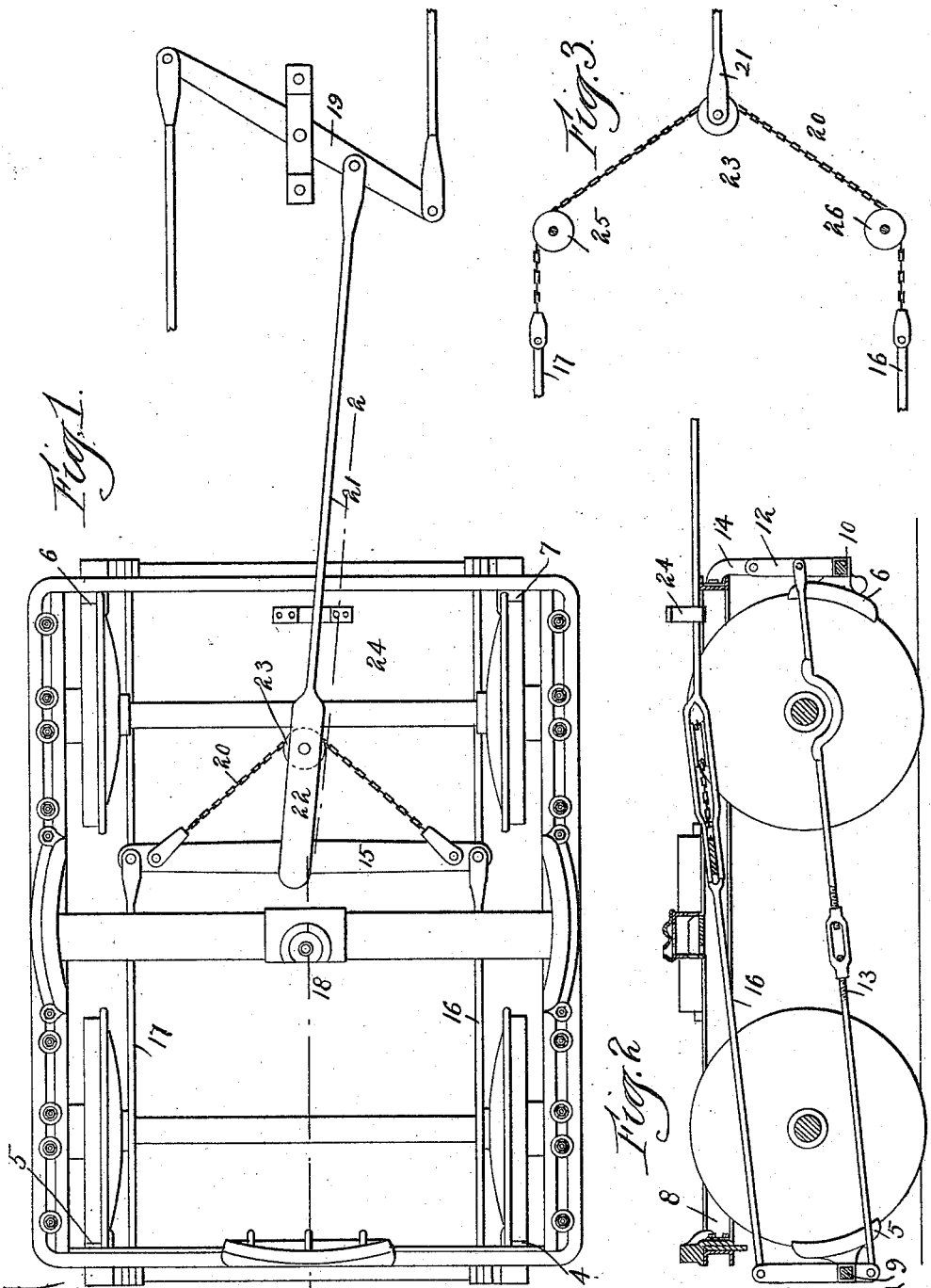
Witnesses
Inventor
Moses G. Hubbard Jr.

UNITED STATES PATENT OFFICE.

MOSES G. HUBBARD, JR., OF CHICAGO, ILLINOIS, ASSIGNOR TO THE McGUIRE MANUFACTURING COMPANY, OF SAME PLACE.

BRAKE CONNECTION FOR TRUCKS.

SPECIFICATION forming part of Letters Patent No. 572,992, dated December 15, 1896.

Application filed June 6, 1895. Serial No. 551,849. (No model.)

*To all whom it may concern:*

Be it known that I, MOSES G. HUBBARD, Jr., a citizen of the United States, residing in Chicago, in the county of Cook and State of Illinois, have invented certain new and useful Improvements in Brake Connections for Trucks, of which the following is a specification, reference being had to the accompanying drawings, in which—
Figure 1 is a partial plan view showing the truck and the operating-lever or cross-head carried by the car. Fig. 2 is a longitudinal section on line 2 2 of Fig. 1. Fig. 3 is a detail showing a modification.
My invention relates to an improved brake connection especially designed for pivotal motor-trucks, but which may be used for other forms of trucks to which it is adapted.

It consists in introducing between the parts of the brake which are attached to the truck and those which are attached to the car-body a traveling member and in providing a flexible track for said traveling member to run upon, the object being to prevent the lengthening and shortening of the brake connections and consequent tightening or loosening of the brakes occasioned by the action of the trucks in curving, as will be hereinafter more fully described.
Where a motor of any kind is located between the axles of a pivotal truck, the brake-operating mechanism must be constructed to go around the motor, and this is generally accomplished by making a connection to each brake-beam near each brake-shoe, making four connections to a truck, or at least a connecting-rod on each side of the motor.

Referring to the drawings, 4 5 6 7 indicate the brake-shoes of the truck. 8 indicates the frame of the truck, and 9 10 indicate the brake-beams.

11 12 indicate the brake-operating levers carried by the truck.

13 indicates connecting-rods which connect the levers 11 12.

As shown in Fig. 2, the levers 12 are pivotally supported from the truck-frame at their upper ends by being pivotally connected to a suitable support 14. The upper ends of the actuating-levers 11 are connected to an equalizing-lever 15 by rods 16 17. If, as is generally the case, the equalizing-lever 15 is located away from the pivotal center of the truck, which is at 18, (shown in Fig. 1,) and an ordinary jaw-and-pin connecting-rod be attached to the center of said equalizing-lever and should extend from that point to the main actuating-lever or cross-head 19, which is attached to the car-body at or near its center and which connects and operates the brakes on both trucks through suitable connecting devices, the brakes will tighten when passing around curves. To prevent this, I attach to the ends of said equalizing-lever 15 the ends of a piece of chain 20 or other strong flexible material, which is enough longer than said equalizing-lever to compensate for the difference in the distance between the center of said equalizing-lever and said actuating cross-head 19 on a straight track and on the shortest curves. Said chain is connected to the cross-head 19 by a connecting-rod 21, having a jaw 22 at its end, and in the end of the jaw on said connecting-rod 21 is pivoted a roller or sheave 23, over which said chain 20 passes. The jaws 22 are extended so that their ends will embrace the equalizer 15, thereby forming a support for the jaw 22 and sheave 23. The rod 21 is further supported by a suitable guide 24, connected to the car-body, as indicated in Fig. 1, so that said rod will always retain its normal position with reference to the car-body.

The equalizer 15 is suitably supported on the trucks, and it therefore follows that as the trucks swing under the car-body on curves the flexible connection 20 will travel upon the sheave 23 through the jaw 22 at the end of the connecting-rod 21 in such manner that the sheave 23 will move in a curved path, the result being that the tendency to tighten the brakes on curves is overcome. The same result can be accomplished without the use of an equalizing-bar 15 by using instead a pair of sheaves or pulleys 25 26, mounted upon the truck-frame at opposite sides thereof, around which sheaves the chain 20 passes, said chain passing around a sheave 23, carried by the rod 21, as before, as shown in Fig. 3. I prefer, however, that form of construction in which an equalizer is used.

That which I claim as my invention, and desire to secure by Letters Patent, is—

1. In a car-brake for pivotal trucks, the combination of a main actuating-lever attached to the car-body, a pair of brake-actuating levers carried by the truck, and a flexible connection between said brake-actuating levers and the said main actuating-lever carried by the car-body, the said flexible connection consisting of a traveling member connected with the main actuating-lever and a flexible device connecting the traveling member with the brake-actuating levers, substantially as and for the purpose specified.

2. In a brake for pivotal motor-cars having two or more actuating-levers attached to the truck, an equalizing-bar forming a connection between the ends of said levers, and a flexible member attached at its ends at or near the ends of said equalizing-bar, in combination with a connecting-rod having a sheave-wheel in or near its end for engaging with and traveling upon said flexible member, substantially as described.

3. In a car-brake for pivotal trucks, a main actuating-lever attached to the car-body, a pair of brake-actuating levers carried by the truck, and a connection between the actuating-lever carried by the car-body and the actuating-levers carried by said truck, said connection consisting of a connecting-rod pivoted at one end to the actuating-lever carried by the car-body, and having a sheave wheel or roller at its other end, and a flexible member constructed to connect with and travel on said sheave wheel or roller to complete the connection between the actuating-lever carried by the car-body and the actuating-levers carried by the truck, substantially as described.

4. In a brake for pivotal motor-trucks, a pair of actuating-levers carried by the truck, an equalizing-bar, connections between the ends of said actuating-levers and said equalizing-bar, and a flexible member connected with said equalizing-bar at or near its ends, in combination with a connecting-rod having a sheave wheel or roller near its end arranged to travel on said flexible member and said equalizing-bar, substantially as described.

MOSES G. HUBBARD, JR.

Witnesses:
JOHN L. JACKSON,
A. H. ADAMS.